(12) United States Patent
Olsson et al.

US008818464B2

(10) Patent No.: US 8,818,464 B2
(45) Date of Patent: Aug. 26, 2014

(54) DEVICE CASE WITH ADDED FUNCTIONALITY

(75) Inventors: Maj Isabelle Olsson, San Francisco, CA (US); Matthew Wyatt Martin, Ross, CA (US); Joseph John Hebenstreit, San Francisco, CA (US); Peter Michael Cazalet, Campbell, CA (US)

(73) Assignee: Google Inc., Mountain View, CA (US)

( * ) Notice: Subject to any disclaimer, the term of this patent is extended or adjusted under 35 U.S.C. 154(b) by 101 days.

(21) Appl. No.: 13/426,255

(22) Filed: Mar. 21, 2012

(65) Prior Publication Data

US 2013/0248412 A1   Sep. 26, 2013

(51) Int. Cl.
H04M 1/00          (2006.01)

(52) U.S. Cl.
USPC .......................................... 455/575.1; 206/5

(58) Field of Classification Search
USPC .................. 206/6.1, 18, 5, 6, 818; 455/575.1, 455/575.8; 351/158
See application file for complete search history.

(56) References Cited

U.S. PATENT DOCUMENTS

| | | | | |
|---|---|---|---|---|
| 1,513,776 | A | * | 11/1924 | Wells ................................. 206/6 |
| 2,047,652 | A | * | 7/1936 | Sproull ............................. 206/6 |
| 2,893,564 | A | * | 7/1959 | Gearhart ....................... 211/85.3 |
| 4,867,551 | A | | 9/1989 | Perera |
| D327,079 | S | | 6/1992 | Allen |
| D334,557 | S | | 4/1993 | Hunter et al. |
| D337,320 | S | | 7/1993 | Hunter et al. |
| 5,455,637 | A | * | 10/1995 | Kallman et al. ................ 351/44 |
| D402,651 | S | | 12/1998 | Depay et al. |
| D436,960 | S | | 1/2001 | Budd et al. |
| D446,499 | S | | 8/2001 | Andre et al. |
| D512,985 | S | | 12/2005 | Travers et al. |
| D559,250 | S | | 1/2008 | Pombo |
| D565,082 | S | | 3/2008 | McClure et al. |
| D602,064 | S | | 10/2009 | Mitsui et al. |
| 7,631,968 | B1 | | 12/2009 | Dobson et al. |
| 7,648,236 | B1 | | 1/2010 | Dobson |
| D611,415 | S | | 3/2010 | Andre et al. |
| 7,675,683 | B2 | | 3/2010 | Dobson et al. |
| D623,136 | S | | 9/2010 | Andre et al. |
| D646,316 | S | | 10/2011 | Zhao |
| 2007/0281752 | A1 | | 12/2007 | Lewis |
| 2009/0201460 | A1 | | 8/2009 | Blum et al. |
| 2010/0045928 | A1 | | 2/2010 | Levy |
| 2011/0213664 | A1 | | 9/2011 | Osterhout et al. |

FOREIGN PATENT DOCUMENTS

EP          1653825 B1    9/2009
WO       2010092904 A1    8/2010

* cited by examiner

*Primary Examiner* — David Fidei
(74) *Attorney, Agent, or Firm* — Lerner, David, Littenberg, Krumholz & Mentlik, LLP

(57) ABSTRACT

A case for a device includes a plurality of walls defining a cavity and an opening to the cavity. A first one of the walls is opposite the opening and is configured as a support surface to support a portion of a first housing of the device and also has a first recess therein configured to receive a portion of at least a first end of a band of the device. A second one of the walls defines an edge of the opening that is configured to extend along a center support of the band with the optical element of the device being positioned between the second one of the walls and the support surface when the device is received in the cavity. The case also includes a lid configured to cover the opening and to selectively enclose the interior cavity.

34 Claims, 8 Drawing Sheets

DEVICE CASE WITH ADDED FUNCTIONALITY

BACKGROUND

In the area of portable consumer electronics, constant reduction of size and weight, along with increased functionality are often sought. While technical advances allow for electronics of a low weight and high-performance to be made that are robust enough to withstand frequent or continuous use, storage and transportation of such device can still subject such devices to damage or premature wear. This can be due to the unexpected and sometimes extreme conditions that users can subject such portable devices to when the devices are stowed, otherwise out of sight, or otherwise being transported while not in use.

Specialized cases have been developed that can add a degree of protection to electronic devices during storage and transportation thereof. These cases can include a custom shape, interior pocket or the like that conforms to the shape of the electronic device and can provide an additional degree of padding or cushioning therefor. Generally, such cases provide nearly consistent contact with the various external surfaces of such devices Such cases, however, can be problematic for some types of portable electronic devices. Head-mounted displays, for example, can include delicate optical components and various adjustable of flexible structures for providing fit on the head of a wearer that some cases can interfere with or damage.

BRIEF SUMMARY

An aspect of the disclosure relates to a case for an electronic device. An example of such an electronic device can include a band extending between first and second ends and having a central support portion. The exemplary device can also include a first housing supporting an optical element on a side of the center support opposite the first and second ends. The case includes a plurality of walls defining a cavity and an opening to the cavity. A first one of the walls is opposite the opening and is configured as a support surface to support a portion of the first housing of the device and also has a first recess therein configured to receive a portion of at least the first end of the band. A second one of the walls defines an edge of the opening that is configured to extend along the center support of the band with the optical element being positioned between the second one of the walls and the support surface when the device is received in the cavity. The case also includes a lid configured to cover the opening and to selectively enclose the interior cavity.

The plurality of walls can include a front wall, a back wall, and a pair of opposed side walls extending away from the support surface. The top wall can extend from the front wall and at least portions of the opposed side walls and opposing the support surface. The edge of the opening can be configured to extend along the band of the device such that a surface of the top wall extends adjacent to a top surface of the band. In such an example, the lid can be configured to contact the surface of the top wall and to substantially contact at least a portion of the top surface of the band. The edge of the opening can be further configured such that a portion of the first housing is positioned between the second one of the walls and the support surface when the device is received in the cavity.

The recess can be configured to receive at least a portion of the first end of the band when the first end is enlarged relative to the second end of the band. Such an enlarged first end can house a power source employed by the device. The case can further include a power source and means for electrically connecting the power source to the power source of the device. In an example, the power source can be a battery. Additionally or alternatively, the power source can be a kinetic charging element or a photovoltaic panel exposed at an exterior surface of the case. The case can further include electronic circuitry configured to facilitate a connection with an external power source.

The recess can include at least one first electrical contact therein configured to contact at least one second electrical contact of the enlarged first end when the enlarged first end is received within the recess. The case can further including a magnet adjacent the recess for magnetically retaining a magnetically sympathetic portion of the first end within the recess. Alternatively, the case can include a ferromagnetic element adjacent the recess for magnetically retaining a magnetic portion of the first end within the recess.

The case can also include a port for connecting the case with an external computing device and electronic circuitry for communicating with the external computing device. The case can further include means for connecting the electronic circuitry with the electronic device such that the electronic device can communicate with the external computing device. Such means for connecting can include a plug configured to connect with a port in the device. Additionally or alternatively, the means for connecting can include short distance wireless communication circuitry.

The support surface can be configured to support a nosepiece attached with the central support portion of the band such that the support surface is configured to provide three points of contact with the device including the nosepiece, the first surface of the first housing, and the first end of the band. The support surface can include a first area for providing the point of contact between the support surface and the nosepiece that is disposed at a first distance from the top surface. A second area can surround the recess and disposed at a second distance from the top surface that is less than the first distance, and a sloped area can extending between the first and second areas. The first distance can be such that at least the central support portion of the band is adjacent a portion of the edge of the opening when the nosepiece is in contact with the first area of the support surface. At least one of the sloped area or the second area can provides the point of contact between the support surface and the first housing.

Another aspect of the disclosure relates to a kit. The kit includes an electronic device having a band extending between first and second ends and with a central support portion, the device also includes an extension arm supporting an optical element on a side of the center support opposite the first and second ends. The kit also includes a case having a support surface including a first recess therein, the recess configured to receive a portion of at least the first end of the band, the surface further being configured to contact a first surface of the extension arm when at least the first end of the band is received in the recess. A front wall, a back wall, and a pair of opposed side walls extend away from the support surface to define an interior space therewith configured to receive the device therein. The case also has top wall extending from the front wall and at least portions of the opposed side walls and opposing the support surface. The top wall defines an opening having an edge configured to extend along the center support of the band with the optical element being positioned between the top wall and the support structure when the device is received in the interior space. The case also has a lid configured to cover the opening and to selectively enclose the interior space.

The first end of the band can be enlarged relative to the second end of the band and can house a power source employed by the device. The recess can be configured to receive at least a portion of the enlarged first end therein.

The case can further include a power source and means for electrically connecting the power source of the case to the power source of the device. The power source of the case can be a battery secured within an internal compartment defined between the support surface and a bottom wall of the case. The case can also include electronic circuitry configured to facilitate a connection with an external power source. Further, the enlarged first end can include at least one first electrical contact exposed on a surface thereof, and the recess can include at least one second electrical contact therein configured to contact the at least one first electrical contact when the enlarged first end is received within the recess. The case can further include a magnet adjacent the recess for magnetically retaining a magnetically sympathetic portion of the first end within the cavity.

The case can include first electronic circuitry and the device can include second electronic circuitry and means for connecting the first electronic circuitry of the case with the second electronic circuitry of the device such that the device can communicate with the case.

Another aspect of the disclosure relates to a kit. The kit includes a case for an electronic device. An example of such an electronic device has a band extending between first and second ends and having a central support portion. Such a device can also have a first housing supporting an optical element on a side of the center support opposite the first and second ends. The case includes a plurality of walls defining a cavity and an opening to the cavity. A first one of the walls is opposite the opening and is configured as a support surface to support a portion of the first housing and has a first recess therein configured to receive a portion of at least the first end of the band. A second one of the walls defines an edge of the opening that is configured to extend along the center support of the band with the optical element being positioned between the second one of the walls and the support surface when the device is received in the cavity. The case also includes a connection port exposed on one of the plurality of walls and a lid configured to cover the opening and to selectively enclose the interior space. The kit further includes a cable configured to connect between the connection port of the case and at least one external device.

In an example, the external device with which the case is configured to connect can be a power outlet. In another example, the external device with which the case is configured to connect can be a computing device. The cable can be configured to provide a signal connection between such a computing device and the case by connection with the port. The case can also include electronic circuitry configured to carry a signal from the computing device via the signal connection. The electronic circuitry can further be configured to deliver the signal to the electronic device.

DETAILED DESCRIPTION

Figure 1:
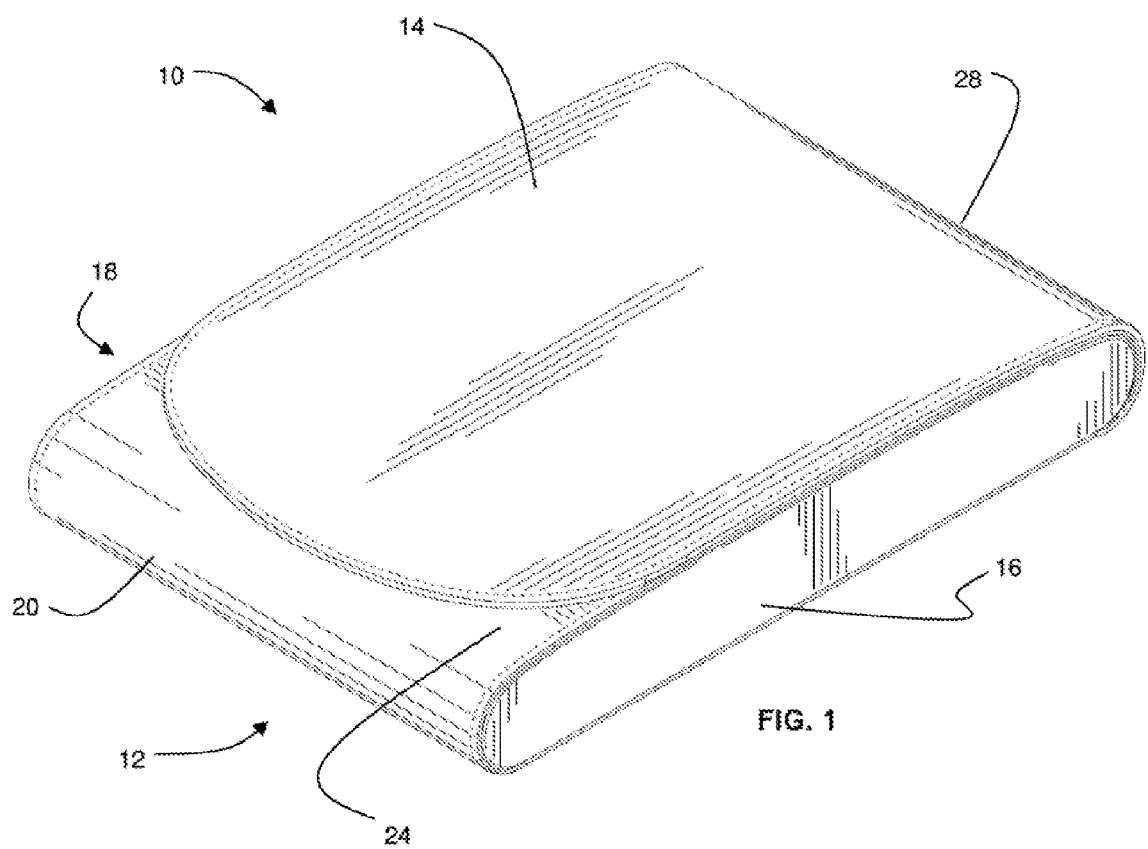
FIG. 1 shows a case according to an embodiment of the disclosure.
Figure 3:
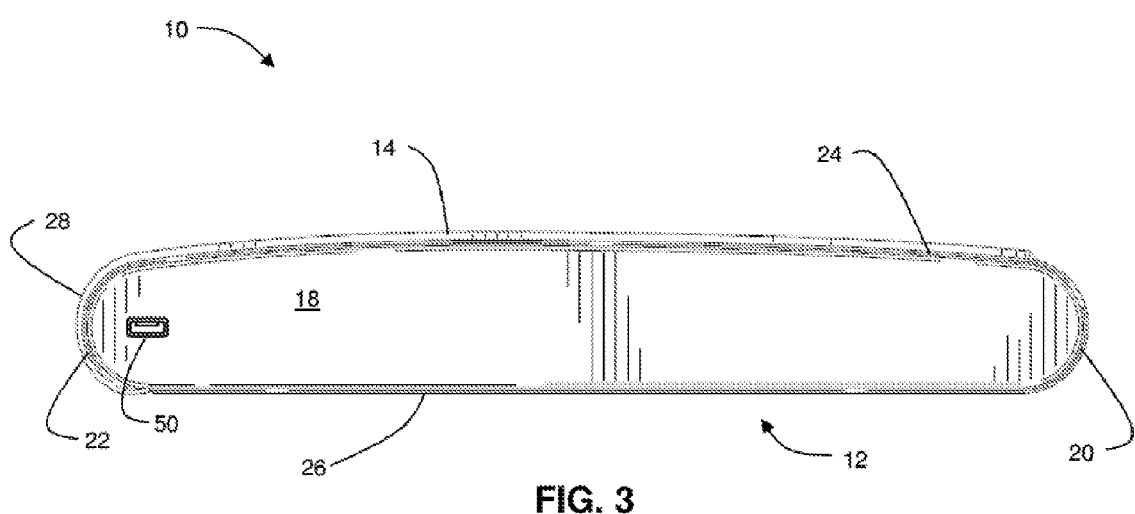
FIG. 3 shows a further alternate view thereof.
Figure 4:
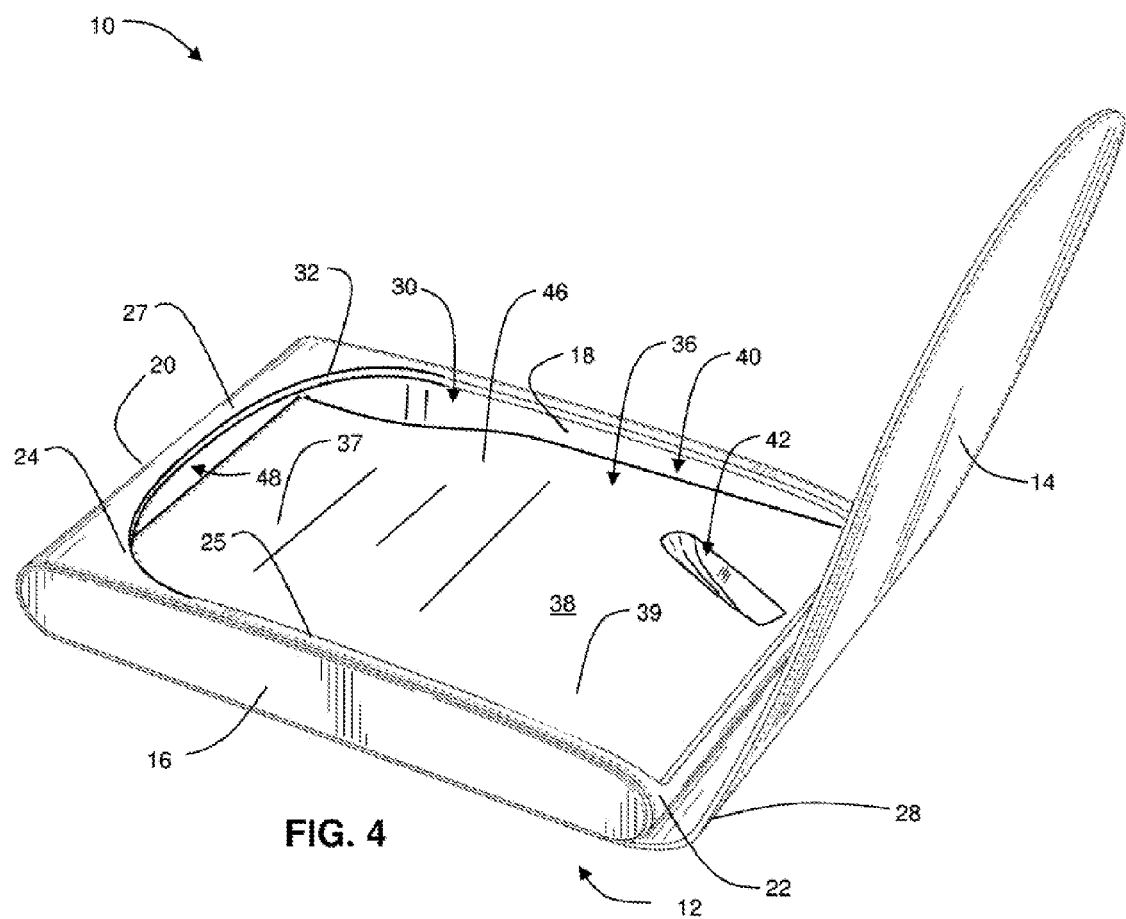
FIG. 4 shows the case of FIG. 1 in an open configuration.

A storage and transportation case 10 according to an embodiment of the disclosure is shown in an exemplary form in FIG. 1. Case 10 includes a base portion 12 and an associated lid 14 that is connected to base 12 by a hinge portion 28 thereof to allow a user to selectively open and close the case 10 by moving lid 14. Case 10 is shown in a closed configuration in FIGS. 1-3 and in an open configuration in FIGS. 4 and 5. Base 12 further includes a right side wall 16 and a left side wall 18 that is spaced apart from and opposes the right side wall 16. A bottom surface 26 extends between the left and right side walls 16 and 18 opposite the closed lid 14. Opposed front 20 and back 22 walls extend upward from the bottom surface 26 between the right 16 and left 18 side walls. A top surface 24 opposes the lower surface 26 and extends between at least portions of the right 16 and left 18 side walls and the front 20 and back 22 walls. An opening 30 (FIG. 4) in top wall 24 provides access to a cavity 40 defined within the top 24, bottom 26, front 20, back 22, right 16, and left 18 walls. Lid 14 is sized and shaped to cover opening 30 when in the closed position (FIG. 1) and to uncover opening 30 when in the open position (FIG. 4). It is noted that the designation of surfaces as left, right, top, bottom, etc. is done for reference only given a possible orientation of the case, and are not intended to be limiting. Similar directional designations are similarly not limiting.

In the embodiment shown, the bottom wall 26, front wall 20, top wall 24, and back wall 22 are integrally formed from a single piece of material (which can be a layered composite of materials) that is looped around right 16 and left 18 side walls. In other similar examples, the bottom 26, front 20, top 24, and back 22 walls can be made from separate pieces of material that are assembled together to give a uniform appearance of a single piece of material. Further, in an alternative example, the right 16 and left 18 side walls can be integrally formed with the top 24 and bottom 26 walls in a loop of material around front 20 and back 22 walls.

Hinge portion 28 and lid 14 can also be integrally formed with the bottom wall 26 (or otherwise attached thereto to give a uniform appearance, extending therefrom opposite integrally formed front wall 20 and adjacent back wall 22. Such an arrangement can allow lid 14 to open wider than, for example, an arrangement where lid 14 is attached to base 12 by a hinge portion 28 that is attached adjacent top wall 24. Attaching hinge portion 28 at bottom wall 26 can also provide an appearance that compliments the uniform wraparound look achieved by integrally forming some of the other walls, as discussed above and can provide signaling to a user as to the direction in which the lid opens, such as by "unrolling" the case.

As mentioned above, the walls (including the right 16 and left 18 side walls, and the top 24, bottom 26, front 20, and back 22 walls, and the lid 14 and hinge portions 28 can be made of a multilayer composite of materials. In an example, the material can include an outer layer of a protective material, such as rubber or a plastic of sufficient flexibility to allow opening of lid 14 by bending hinge portion 28. In one embodiment, the outer layer can be made from leather or a synthetic leather to give a pleasant tactile feel and a "high-end" appearance, while providing a degree of protection. The material can also include an inner layer of a generally cushioning material. Such a "dual density" composite structure is known to give increased protective qualities over a single layer.

Materials that can be used on the inner layer can include various rubbers, latex, silicon, TPE, foams (such as foam rubber or neoprene), or a soft-touch coating. The inner layer can also be a fabric such as cotton or velvet of various synthetic fabrics. In an example a microfiber fabric can be used for inner layer in the form of a microsuede, microfleece, or woven microfiber cloth. Such microfiber fabrics can provide additional protection against delicate surfaces of, for example, a device stored within case 10, and can even provide cleaning or polishing of various elements of such a device during storage or transportation. The layers can be attached together by adhesives, including various tapes or glues, or can be stitched together. The composite materials can be cut into the shapes needed for the individual portions of case 10 and can be attached together to give the desired form of case 10 by glue or by sewing or by a combination of gluing and sewing. Staples and rivets, for example can also be used for affixing together various fabric panels or sheets used to give the form of case 10.

The multilayer composite structure can also include a reinforcement layer interposed between the inner and outer layers. Such reinforcement layer can be a rigid layer of material, such as metal or plastic. Acceptable metals can include aluminum or steel, and acceptable plastics can include styrene, polyvinyl-chloride ("PVC"), polyethelene, polycarbonate, ABS, polypropylene, or the like. The reinforcement layer can be included in various areas of case 10 while being absent in other areas to provide selective rigidity and density of various areas thereof. In an example, lid 14 can include reinforcement, while hinge portion 28 can have no reinforcement to allow hinge portion 28 to bend, while giving lid 14 additional protective qualities. Further, hinge portion 28 can have relative thinner or more flexible material or can include reinforcement with selective grooves or slots formed therein to adjust the flexation qualities thereof.

Alternative structures for case 10 are also possible, including those in which the top 24, bottom 26, front 20, back 22, right 16, and left 18 walls are made from one or more pieces of molded plastic with lid 14 attached thereto by a physical hinge structure.

In an embodiment, lid 14 can be retained in the closed position by embedded and aligning magnets in top wall 24 and lid 14 in an overlapping portion thereof. Such magnets can be of a sufficient strength to hold lid 14 in the closed position during storage and transportation of case 10, including when stowed in luggage or a backpack, for example. Such magnets should, however, not be too strong to prevent reasonable access to the cavity 40 by opening lid 14. Other closure mechanisms are possible, including hook-and-loop style closures such as Velcro™ or snaps positioned in overlapping areas of the lid 14 and top wall 24 to align and engage when lid 14 is closed against top wall 24. As a further alternative, a buckle or clasp can be attached between base 12 and lid 14 to secure closure of the lid 14.

Opening 30 can be sized and shaped to extend nearly all the way between right 16 and left 18 side walls. In the example shown, top wall 24 includes only thin portions 25 thereof extend along a majority of right 16 and left 18 side walls. The inclusion of thin portions 25 can add structure to side walls, and can be sized to provide such structure without significantly decreasing the size of the opening 30. Opening 30 can be configured to further extend into a portion of back wall 22. This can provide additional access to cavity 40 such as for insertion or removal of a device therefrom. The above-described arrangement in which hinge portion 28 can be attached adjacent bottom wall 26 of case 10 can accommodate such an extended opening.

Top wall 24 can also include a front portion 27 thereof that extends between right 16 and left 18 side walls and away from front wall 20 in a direction toward back wall 22. Front portion 27 can oppose an interior surface 38 of cavity 40 to provide a pocket area 48 wherein cavity 40 is bounded on at least five sides thereof. Such a pocket area 48 can be positioned and configured to provide an area of additional protection for certain components of a device stored or transported in case 10.

Case 10 can also include an insert 36 that is assembled into cavity 40 and can define the interior surface 38 thereof. The insert 36 can be configured to provide a contour of interior surface 38 that is different from that defined by an inside surface of, for example, bottom wall 26 or right 16 and left 18 side walls. Such a contour can be specifically configured to cradle or otherwise accommodate a shape of a device that case 10 is configured to store and transport. In the example shown the contour provided by the insert 36 through interior surface 38 can include a slope 46 that transitions between areas of differing heights of interior surface 38 above bottom surface 26. The insert can also define a recess 42 therein that can be configured to receive a specific feature of the device that case 10 is configured to receive within cavity 40.

Figure 6:
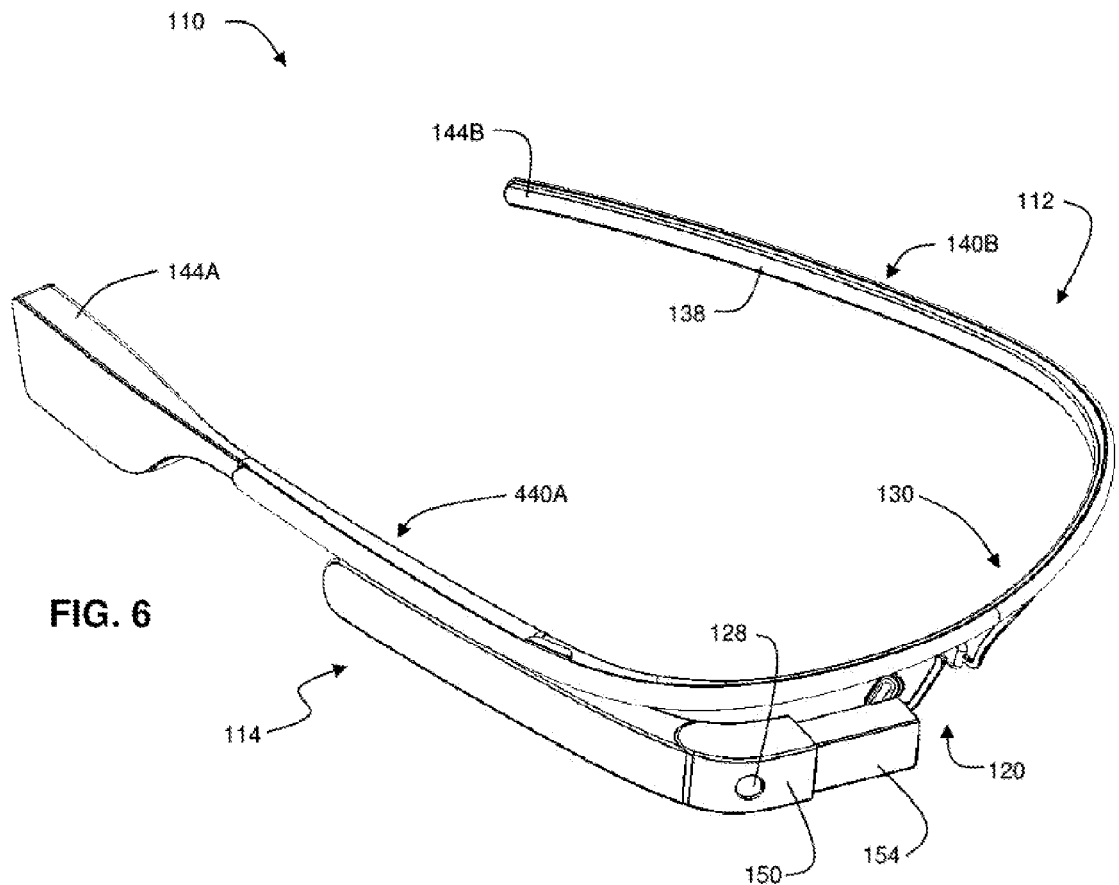
FIG. 6 shows a wearable electronic device with which the case of FIG. 1 can be used.
Figure 7:
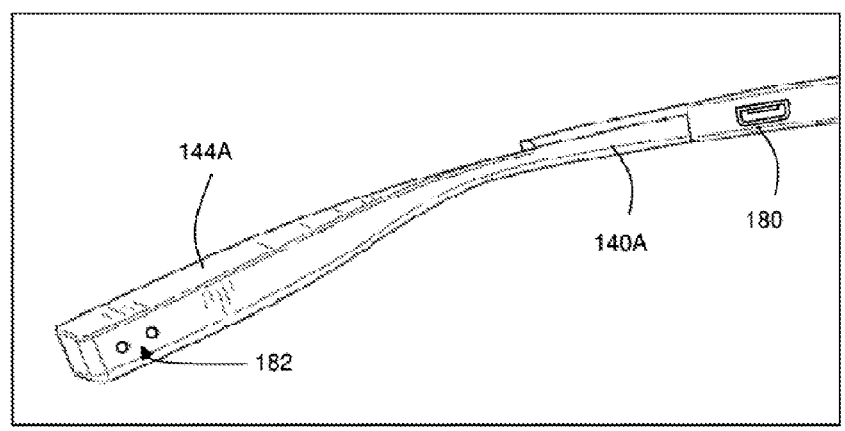
FIG. 7 shows a detail view of a portion thereof.

In an embodiment, case 10 can be configured to store or transport a head-wearable display device, an example of which is shown in FIG. 6. The example of device 110 shown can include a band 112 that provides a desired fit of device 110 on a user's head. Device 110 can further include an extension arm 114 that extends from a portion of band 112 to a free end 116 thereof that includes a display element 154. Extension arm 114 can be configured such that, when device 110 is worn by a user, display 154 mounted on extension arm 114 can be positioned adjacent the user's eye, within the user's line of sight of at least that eye, for making an image presented thereon viewable by the user.

Band 112 is shown in FIG. 6 as including a central portion 130 with side arms 140A,140B extending away from opposite sides of the central portion 130. Central portion 130 can include a nosepiece 120 configured to rest on the nose of a wearer with the central portion 130 providing a central support for side arms 140A,140B, which can extend unitarily therefrom including a bend or curve therebetween. Accordingly, device 110 can be worn on a user's head such that nosepiece 120 can rest on the user's nose with side arms 140A,140B extending over respective temples of the user and over adjacent ears. The device 120 can be configured such that display element 154 is appropriately positioned in view of one of the user's eyes.

Figure 5:
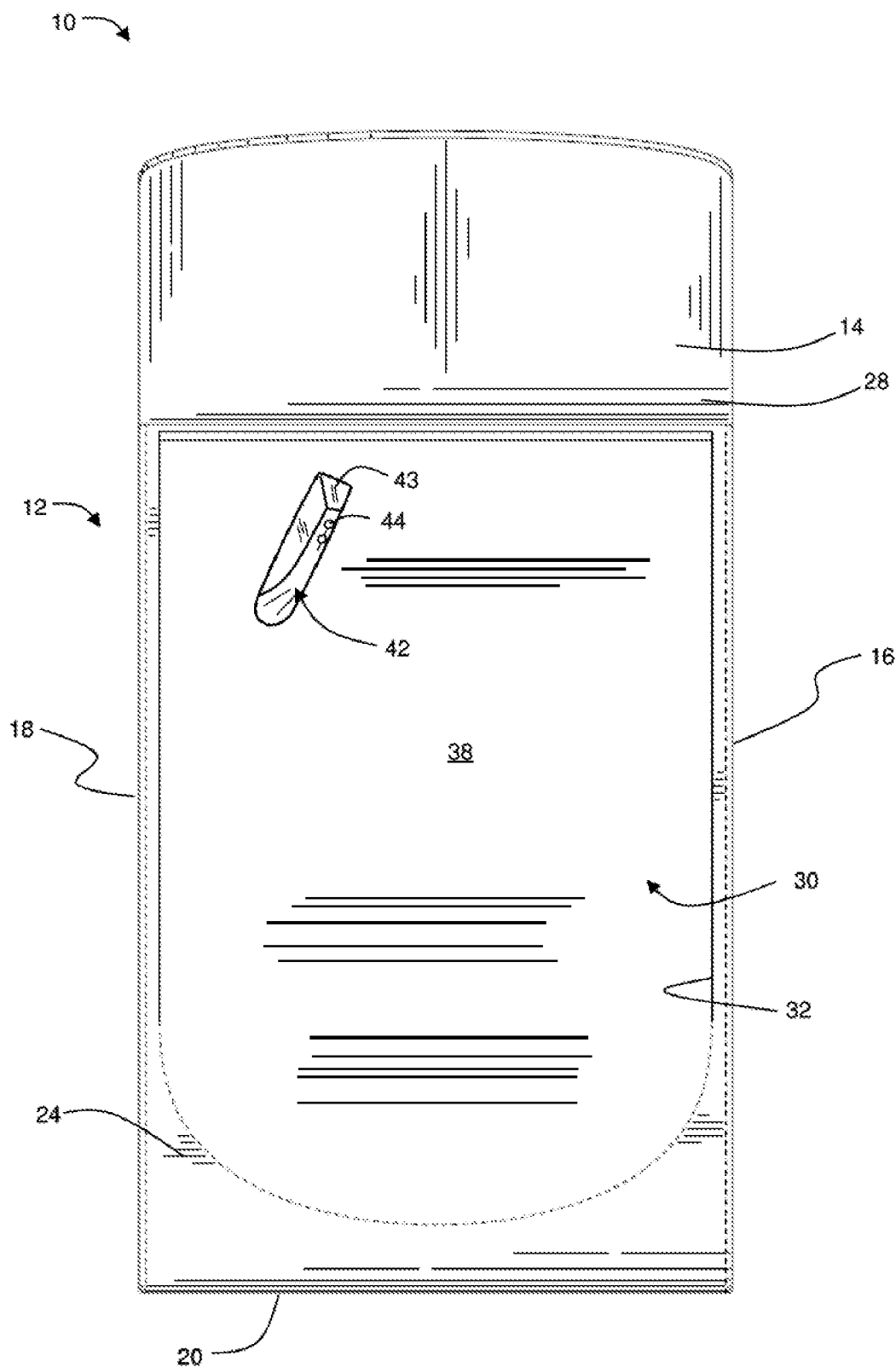
FIG. 5 shows an alternate view thereof.
Figure 9:
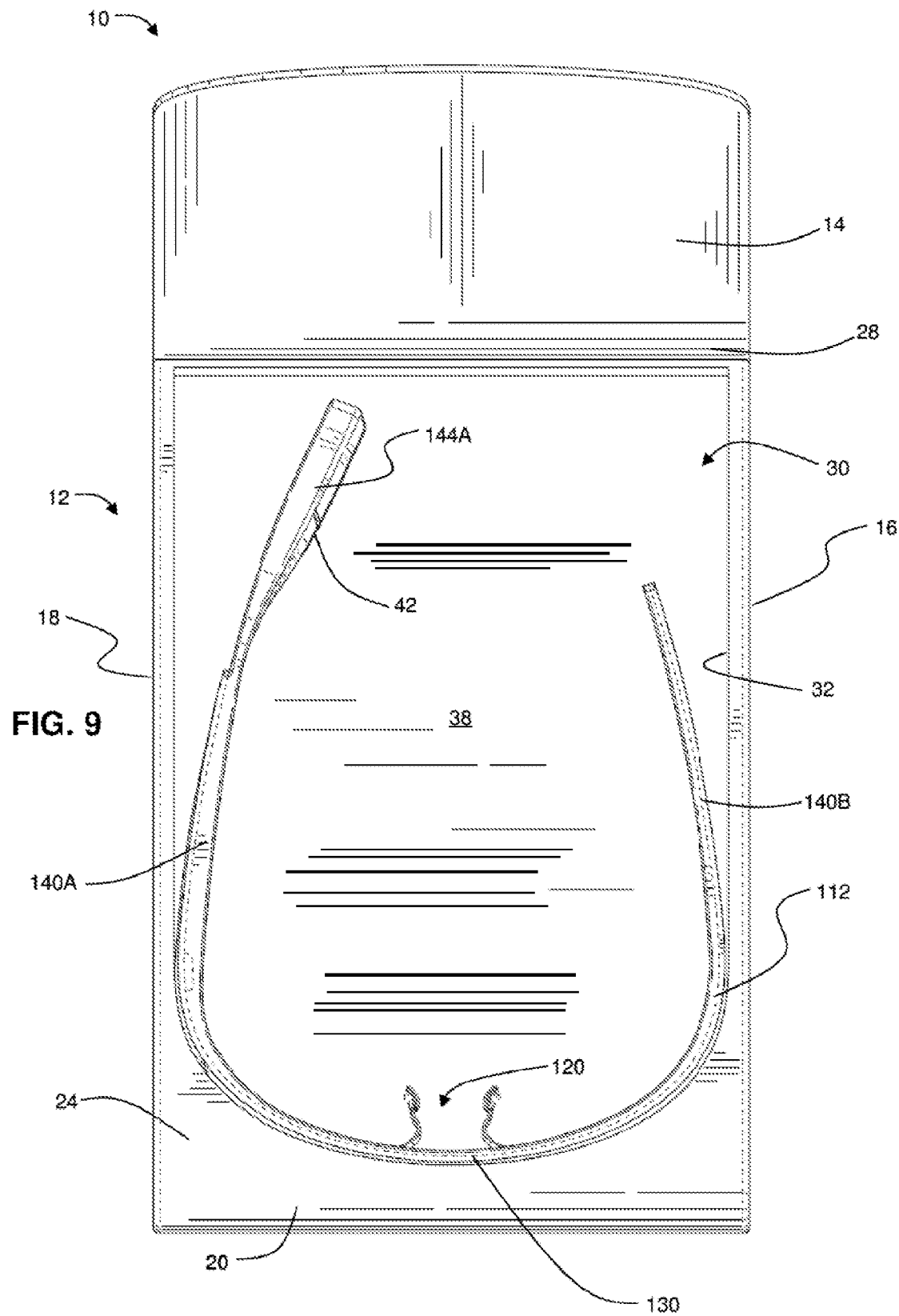
FIG. 9 shows an alternate view thereof.

Side arms 140A,140B can be configured to contact the head of the user along respective temples or in the area of respective ears of the user. Side arms 140A,140B include respective free ends 144 opposite central portion 130. Free ends 144 can be positioned to located near the ear of a user when wearing device 110. As shown in FIGS. 5 and 9, the center portion 130 and side arms 140A,140B may generally have a "U" shape. In this example, the U shape is asymmetric. The asymmetry is due, in part, to the different configurations of the free ends 144A,144B of the side arms 140A,140B. As shown, free end 144A may be enlarged to house circuitry and/or a power supply (e.g., removable or rechargeable battery) for the device 110. The configurations of the two free ends may be switched so that free end 144B houses circuitry and/or power supply equipment.

Extension arm 414 can include a first portion 176 that extends downward from band 112 at a first portion 476 that can be shaped to also extend along a length of band, such as along side arm 140A. First portion 176 is further shaped to extend away from band 112 to an elbow portion 150 connected with first portion 176 by a joint 156. Elbow portion 150 can support display 154 at an angle relative to arm 176 that can be adjusted by rotation of elbow portion 150 about joint 156.

Enlarged free end 144A can also include one or more connection contacts 182 that can be used to connect device 110 to a power source to recharge a battery without removal thereof. Further device 110 can include a connection port 180 that can be used to connect device 110 to an external device such as a smartphone or a computer. Port 180 can be any standardized connection type port such as USB, fire-wire, thunderbolt, or a specialized port 180. Port 180 can also be configured to connect with a power source to charge a battery within device 110. Other features, structures, and functionality of device 110 can be similar to those of the head-wearable display device described in the co-pending U.S. patent application filed on Mar. 21, 2012, designated as U.S. patent application Ser. No. 13/426,033, the entire disclosure of which is incorporated by reference herein.

Figure 8:
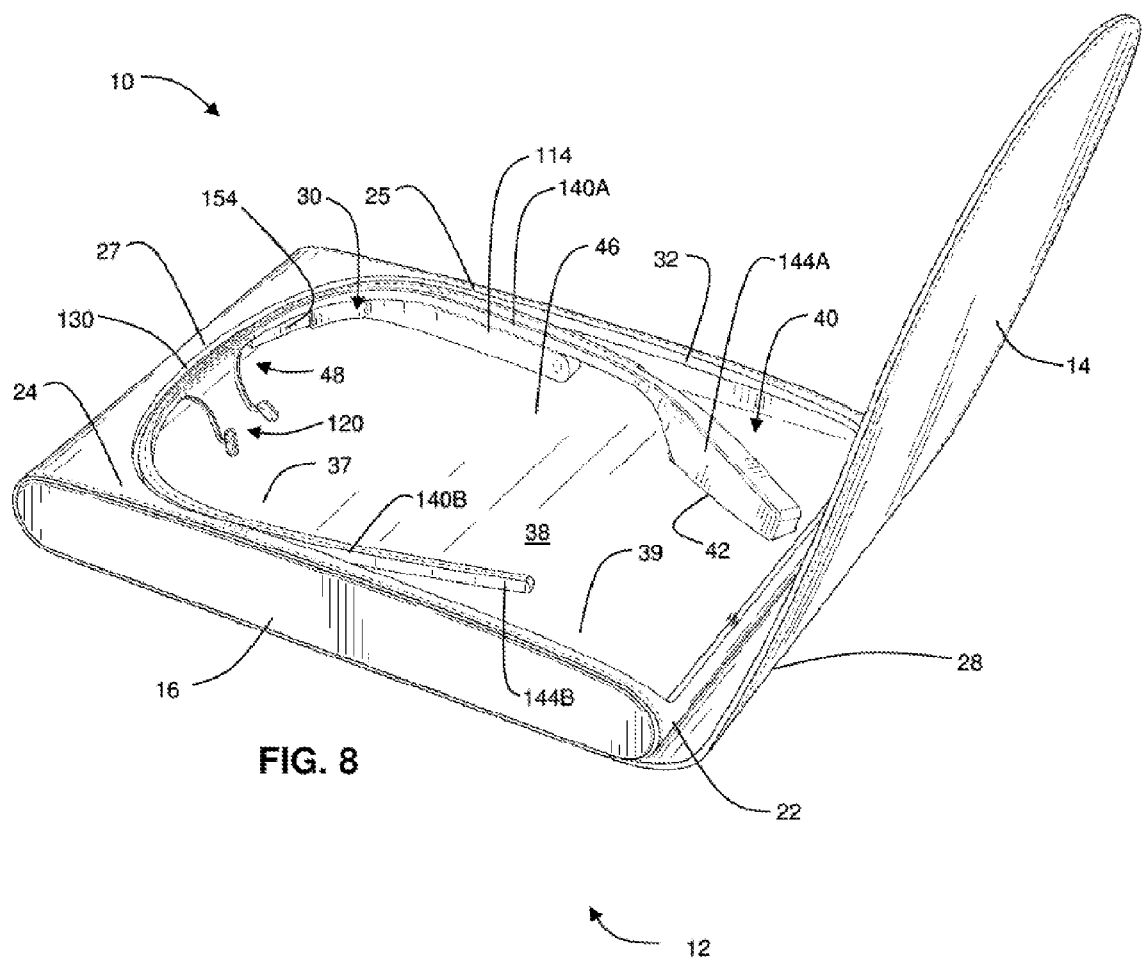
FIG. 8 shows the device of FIG. 5 positioned within the case of FIG. 1 in an open configuration.

As shown in FIGS. 8 and 9, case 10 can be configured to receive and retain device 110 therein. In an example, opening 30 of case 10 defines an edge 32 that has a shape that generally matches that of at least a portion of band 112 of device 110. In the example shown the edge 32 of opening 30, including the portion of which that is defined along the front portion 27 of the top wall 24 of base 12, is shaped to conform to the curved shape of central portion 130 of band 112. The similar shape between edge 32 and a portion of band 112 can be such that a portion of edge 32 contacts a portion of band 112 or to provide some degree of clearance therebetween.

The shape of front portion 27 of top wall 24, including the associated portion of edge 32 thereon can further be configured such that pocket area 48 of cavity 40 can accept display element 154 and at least an adjacent portion of extension arm 114 therein. Such a configuration can provide specific protection for display element 154, which can include delicate optical components, and for the portions of extension arm 114 that include joint 156 or camera 128. Pocket area 48 can further be configured to accept display 154 therein when display 154 is positioned in any position within a range of adjustability provided by joint 156.

Case 10 can further be configured to store or transport device 110 by the configuration of insert 36. Specifically, insert 36 can be configured such that a first area 37 of interior surface 38 is positioned at a first distance from top surface 24 such that nosepiece 120 can contact a portion of the surface 38 with central portion 130 of band 112 adjacent edge 38, as discussed above. The slope 46 defined by surface 38 can transition to a second area 39 thereof that is closer to top wall 24 than first area 37. Second area 39 can be configured such that a portion of extension arm 114, such as near an end thereof disposed toward enlarged free end 144A can rest on surface 38 with the adjacent side arm 140A positioned near or at least vertically aligned with edge 32 of opening 30. In another example, slope 46 can be configured such that a portion of extension arm 114 can rest thereon. Insert can also be structured such that slope 46 is compound and surrounds a portion of the first area 37 on, for example, three sides thereof to a similarly-configured second portion 39 that further surrounds a portion of the first area 37 on three sides.

Insert 36 can also be configured such that recess 42 can receive a portion of enlarged free end 144A therein. To achieve this, insert can be configured such that the second area 39 of surface 38 is positioned close enough to top wall 24 of base 12 such that recess can be provided to allow enlarged free end 144A to extend below surface 38. Further, top wall 24 can be positioned far enough away from top surface 24 to prevent surface 38 from interfering with side arm 140A. As shown in FIG. 8, side arm 140B and free end 144B thereof may not contact surface 38. The arrangement described herein, where nosepiece 120, extension arm 114 (or at least a portion thereof) and enlarged free end 144A contact a portion of insert 38, three points of contact are provided in an arrangement that provides stability to support a position of device 110 in which band 112 is in contact with or at least substantially vertically aligned with edge 32 of opening 30. In a variation of device 110 in which both free ends 144A and 144B are enlarged, insert 38 can include two such recesses to accommodate both ends separately.

Recess 42 can be configured to substantially match the shape of the portion of enlarged free end 144A that is configured to be received therein. This can help to provide stability in a front-back direction with respect to case 10 such that central portion 130 of band 112 can contact edge 32 along the front portion 27 of the top wall 24 with enlarged free end 144A contacting a rear wall 43 of recess 42. The position of display 154 and the adjacent portion of extension arm 114 within pocket area 48 can further provide retention of device 110 within cavity 40 such that device 110 can not be removed by movement of device 110 in a directly vertical direction. As such, to remove device 110 from case 10, a user can first move enlarged free end 144A vertically to rotate device 110 about nosepiece 120 on surface 38. Once enlarged free end 144A is clear of recess 42, device 110 can be moved in a rearward direction to move display 154 and the adjacent portion of extension arm 114 out of pocket area 148. After that, the device 110 can be removed from cavity by continued rearward motion, by vertical motion, or by a combination thereof. Device 110 can be inserted into cavity in a reversal of this procedure in which display 154 is positioned within pocket area 48 before rotating device 110 such that enlarged free end 144A is received within recess 42.

To further help maintain a position of device 110 within case 10, recess 42 can include a magnet disposed therein or disposed within insert 38 adjacent a surface of recess 42. Such a magnet can be configured for mutual attraction with a magnetically sympathetic feature (such as another magnet or a piece of ferromagnetic material) disposed within enlarged free end 144A of device 110. Accordingly, when enlarged free end 144A is positioned within recess 42, the magnet can provide a retention force to secure enlarged free end 144A within recess 42. By including such magnets to retain enlarged free end 144A within recess 42, it may be possible to position the first area 37 of surface 38 such that nosepiece 20 does not have to be in contact therewith to appropriately position band 112 adjacent edge 32. That is, the use of magnets can allow for proper positioning of device 110 with only two points of contact with surface 38. In an alternative arrangement, enlarged free end 144A can include a magnet therein, and recess 42 can include a ferromagnetic element therein.

As shown in FIG. 5, recess 42 can include electrical contacts 44 exposed therein. Contacts 44 can be configured to align with and engage the contacts 182 that are exposed on enlarged free end 144A when enlarged free end 144A is received within recess 42. The contacts 44 can be spring-biased outward with respect to the surface on which they are exposed to help ensure contact with the contacts 182 of device 110. In an embodiment where a magnet and a ferromagnetic element is respectively disposed within recess 42 and enlarged free end 144A, such magnets can be positioned to guide the contacts 44 and 182 into the desired mutual engagement. The connection between contacts can be used to provide an electrical current to device 110 that can be used to power the device 110 or to charge a battery within device 110 such as within enlarged free end 144A. Device 110 can be configured to enter a sleep mode or to power down when connections 44 and 118 are engaged, either automatically or upon receipt of a signal from case 10. In other embodiments, recess 42 can include prongs, barrel-type connections, or other connection elements that can physically plug into a port or ports included on enlarged free end 144A of device.

Figure 2:
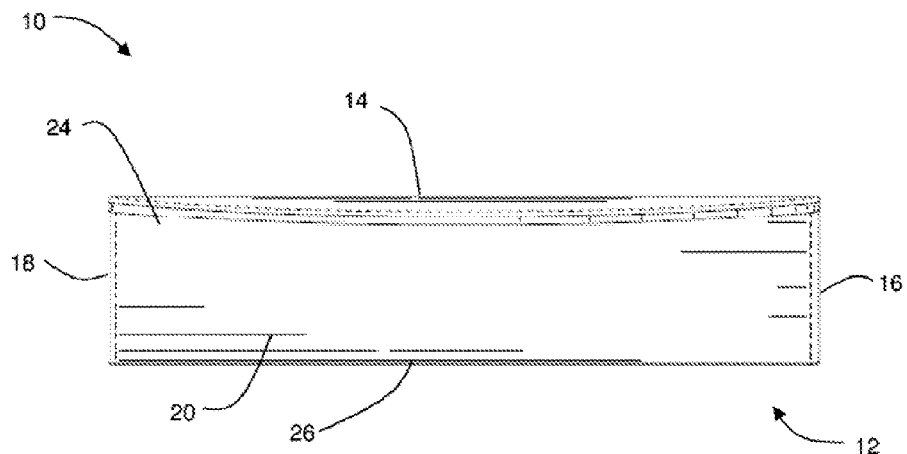
FIG. 2 shows an alternate view of the case of FIG. 1.

Case 10 can include internal circuitry to provide an electrical current to device 110 through contacts 44 and 182. Such circuitry can be positioned within insert 36 or within an interior spaced defined between insert 36 and an interior side of bottom wall 26. The current can be provided by a battery 52 (FIG. 10) that can further be concealed beneath surface 38 such as inside insert 36. Power for the battery or alternative power for device 110 can be provided by connecting case 10 with an external power source that can connect to case 10 through port 50 that is disposed on an outside surface of case 10, which can include left side wall 18, as shown in FIG. 2, for example. The port 50 can be a USB style port, or another type of port that can be used to carry at least one electronic signal in addition to an electrical current. The use of such a port can allow case 10 to connect with a computer or another electronic device, allowing case 10 to communicate therewith. Additionally or alternatively, case 10 can include alternative power sources therein. In an example, a photovoltaic panel can be included on one or more outside surfaces of case 10 to provide power for the circuitry that can then be passed onto device 110. Still further, a kinetic charging structure can be included with the electronic circuitry within case 10 such that motion of the case 10 can charge either the internal battery 52 or device 110 directly, through the connection described above. Such kinetic charging structures can use a weighted piston or a weighed cam arrangement, the movements of which are transferred to a current by induction. Additionally or alternatively, piezoelectric circuitry can be used for such kinetic charging. Insert can include an indicator light or indicator lights to signal to a user that the device 110 is properly electrically connected with the case 10 or when device 110 has reached a fully-charged state. Such a light can be, for example an LED light or a light tube connected with an LED light and can be positioned on surface 38 in the area surrounding recess 42 or within recess 42 itself so the light is visible around free end 144A but the light source itself cannot be seen.

Figure 10:
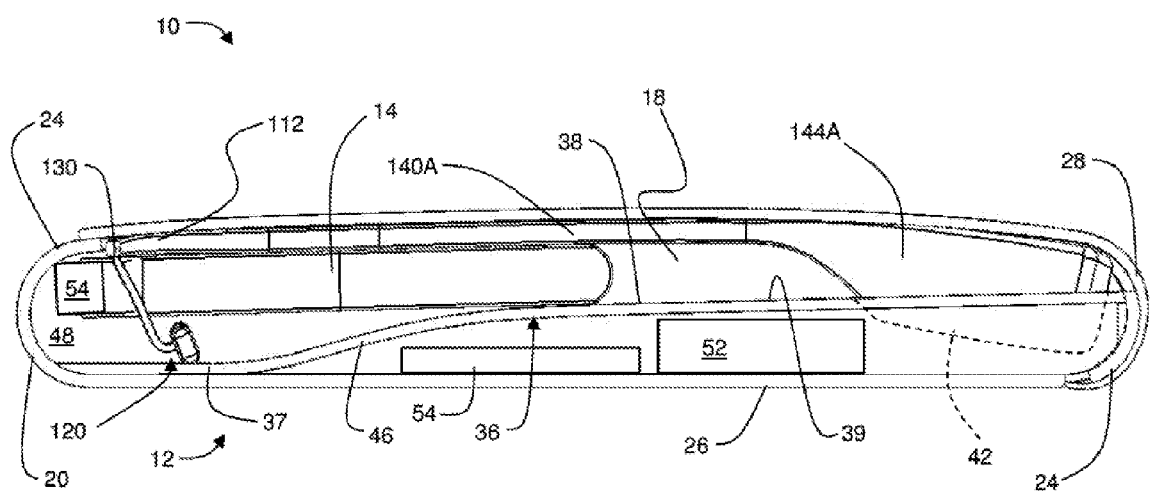
FIG. 10 shows a cross-section view of the case and device of FIG. 8 in a closed configuration.

Further, the electronic circuitry 54, within case 10 can be configured to facilitate a connection between device 110 and a computer or other electronic device at least when device 110 is received within cavity 40. In one example, connections 44 and 182 can be configured to form a connection that is capable of carrying one or more electronic signals in addition to the electrical current carried therebetween. Further, the electronic circuitry 54 of case 10 can include circuitry for communicating along a short-range wireless radio protocol, such as Bluetooth™, ZigBee™ or the like that can communicate with similar circuitry within device 110. Such circuitry 54 can be positioned in beneath insert 36, as illustrated in FIG. 10. Still further, case 10 can include a communication cable or communication connection, such as a USB cable or a USB connection that can attach with port 180 on extension arm 114 of device 110. In one example, a USB connection end that matches with port 180 can extend from surface 38 in a position to engage with port 180 when device 110 is placed within cavity 40. Such a connection could be retractable. Any of these arrangements can be used to allow case 10 to act as a dock for device 110 by which device 110 can connect with a computer, for example, when stored within case.

When device 110 is positioned within case 10, as shown in FIG. 8, lid 14 can be moved into the closed position shown in FIGS. 1 and 10. Such positioning of lid 14 can cover opening 30 and conceal and secure device 110 inside case 10. The arrangement described above, wherein case 10 and device 110 are configured such that when device 110 is appropriately positioned within case, band 112 aligns with edge 32, can be such that when lid 14 is closed, a portion of lid contacts at least a portion of top wall 24 and also contacts a portion of band 112, as shown in the cross-section view of FIG. 10. In another embodiment, lid 14 can be slightly spaced apart from band 112 to provide some tolerance for the configuration of band 112 or the positioning of device 110 within case 10. Either such arrangement can provide an additional measure of security of the fit of device 110 within case 10.

In other embodiments, insert 36 can be configured with additional recesses to receive other devices that can be associated or used with device 110, such as earphones, an adapter cable or the like. In still further embodiments, accessories that are sold separately from device 110, case 10, or both can be sold with a protective element that is configured to cradle or otherwise retain such accessories and are further configured to attach within case, such as by a snap, magnetic, or hook-and-loop attachment with surface 38, with lid 14 or other portions of case 10.

Still further embodiments of a case such as case 10 can be configured to store or transport other electronic devices such as smart phones, video cameras, computers or computer equipment, tablet computers or the like.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A kit, comprising:
   a case for an electronic device having a band extending between first and second ends and having a central support portion, the device also having a first housing supporting an optical element on a side of the center support opposite the first and second ends, the case including:
   a plurality of walls defining a cavity and an opening to the cavity, wherein a first one of the walls is opposite the opening and is configured as a support surface to support a portion of the first housing and has a first recess therein configured to receive a portion of at least the first end of the band, and wherein a second one of the walls defines an edge of the opening that is configured to extend along the center support of the band with the optical element being positioned between the second one of the walls and the support surface when the device is received in the cavity;
   a connection port exposed on one of the plurality of walls; and
   a lid configured to cover the opening and to selectively enclose the interior space; and
   a cable configured to connect between the connection port of the case and at least one external device.

2. The kit of claim 1, wherein the external device with which the case is configured to connect is a power outlet.

3. The kit of claim 1, wherein the external device with which the case is configured to connect is a computing device.

4. The kit of claim 3, wherein the cable is configured to provide a signal connection between the computing device and the case by connection with the port.

5. The kit of claim 4, wherein the case includes electronic circuitry configured to carry a signal from the computing device via the signal connection, the electronic circuitry being further configured to deliver the signal to the electronic device.

6. A case for an electronic device, the electronic device including a band and a first housing, the band including first and second side arms coupled to a central portion therebetween, the first side arm including an enlarged end opposite the central portion, the first housing being coupled to a first side of the first side arm adjacent to the central portion, the first housing supporting an optical element adjacent the central portion, the case comprising:
 a support wall configured to support the electronic device, the support wall including a recess arranged adjacent a first region thereof, the recess configured to receive at least a portion of the enlarged end of the first side arm of the electronic device;
 first and second sidewalls arranged along opposite sides of the support wall;
 first and second end walls arranged along opposite ends of the support wall, the first end wall being disposed adjacent to the first region of the support wall, and the second end wall being disposed adjacent to a second region of the support wall, the second end wall including an edge at least partly defining an opening into the case and defining a pocket area configured to receive the optical element, a section of the edge having a shape that generally matches at least a section of the central portion; and
 a lid coupled to the first end wall.

7. The case of claim 6, wherein the shape of the section of the edge is substantially U-shaped.

8. The case of claim 6, wherein the support walls, first end wall, second end wall, and the first and second side walls are formed from one or more pieces of material.

9. The case of claim 6, wherein the edge of the opening is configured to extend along the band of the device such that a surface of the second end wall extends adjacent to a top surface of the central portion of the band, and wherein the lid is configured to contact the surface of the second end wall.

10. The case of claim 6, wherein the edge of the opening and the pocket area are further configured such that a portion of the first housing is received within the pocket area when the device is received in the case.

11. The case of claim 6, further including a case power source and means for electrically connecting the case power source to a power source of the device.

12. The case of claim 11, wherein the case power source includes a battery.

13. The case of claim 11, wherein the case power source includes a kinetic charging element.

14. The case of claim 11, wherein the case power source includes a photovoltaic panel exposed at an exterior surface of the case.

15. The case of claim 6, further including electronic circuitry configured to facilitate a connection with an external power source.

16. The case of claim 6, wherein the recess includes at least one first electrical contact therein configured to contact at least one second electrical contact of the enlarged end when the enlarged end is received within the recess.

17. The case of claim 6, further including a magnet adjacent the recess for magnetically retaining a magnetically sympathetic portion of the enlarged end within the recess.

18. The case of claim 6, further including a ferromagnetic element adjacent the recess for magnetically retaining a magnetic portion of the enlarged end within the recess.

19. The case of claim 6, further including:
 a port for connecting the case with an external computing device; and
 electronic circuitry for communicating with the external computing device via the port.

20. The case of claim 19, further including means for connecting the electronic circuitry with the electronic device such that the electronic device can communicate with the external computing device.

21. The case of claim 20, wherein the means for connecting includes a plug configured to connect with a port in the device.

22. The case of claim 20, wherein the means for connecting includes short distance wireless communication circuitry.

23. The case of claim 6, wherein the support wall is further configured to support a nosepiece of the central support portion of the band such that the support wall is configured to provide at least three points of contact with the device including the nosepiece, a first surface of the first housing, and the enlarged end.

24. The case of claim 23, wherein:
 the second region of the support wall provides the point of contact between the support wall and the nosepiece, the second region being disposed at a first distance from the lid when the lid is in a closed position;
 the first region of the support wall being disposed at a second distance from the lid when the lid is in the closed position, the second distance being less than the first distance; and
 the support wall further includes a sloped area extending between the first and second regions.

25. The case of claim 24, wherein the first distance is such that at least the central portion of the band is adjacent a portion of the edge of the opening when the nosepiece is in contact with the second region of the support wall.

26. The case of claim 24, wherein at least one of the sloped area or the first region provides the point of contact between the support wall and the first surface of the first housing.

27. A kit, comprising:
 an electronic device including a band extending between first and second ends and having a central support portion, the device also including an extension arm supporting an optical element on a side of the center support opposite the first and second ends; and
 a case including:
  a support surface including a first recess therein, the recess configured to receive a portion of at least the first end of the band, the surface further being configured to contact a first surface of the extension arm when at least the first end of the band is received in the recess;
  a front wall, a back wall, and a pair of opposed side walls extending away from the support surface to define an interior space therewith configured to receive the device therein;
  a top wall extending from the front wall and at least portions of the opposed side walls and opposing the support surface, the top wall defining an opening having an edge configured to extend along the center support of the band with the optical element being positioned between the top wall and the support structure when the device is received in the interior space; and a lid configured to cover the opening and to selectively enclose the interior space.

28. The kit of claim 27, wherein the first end of the band is enlarged relative to the second end of the band, the enlarged first end housing a power source employed by the device, and wherein the recess is configured to receive at least a portion of the enlarged first end.

29. The kit of claim 28, wherein the case further includes a power source and means for electrically connecting the power source of the case to the power source of the device.

30. The kit of claim 29, wherein the power source of the case is a battery secured within an internal compartment defined between the support surface and a bottom wall of the case.

31. The kit of claim 30, wherein the case includes electronic circuitry configured to facilitate a connection with an external power source.

32. The kit of claim 27, wherein the enlarged first end includes at least one first electrical contact exposed on a surface thereof, and wherein the recess includes at least one second electrical contact therein configured to contact the at least one first electrical contact when the enlarged first end is received within the recess.

33. The kit of claim 27, wherein the case further includes a magnet adjacent the recess for magnetically retaining a magnetically sympathetic portion of the first end within the cavity.

34. The kit of claim 27, wherein the case includes first electronic circuitry and the device includes second electronic circuitry, the case further including means for connecting the first electronic circuitry of the case with the second electronic circuitry of the device such that the device can communicate with the case.

* * * * *